United States Patent [19]
Hilbert

[11] 3,721,766
[45] March 20, 1973

[54] FREQUENCY MULTIPLYING CIRCUIT UTILIZING TIME GATES AND SWITCHING SIGNALS OF DIFFERING PHASES

[75] Inventor: Francis H. Hilbert, Addison, Ill.

[73] Assignee: Motorola, Inc., Franklin Park, Ill.

[22] Filed: Nov. 16, 1970

[21] Appl. No.: 89,706

Related U.S. Application Data

[63] Continuation-in-part of Ser. No. 849,853, Aug. 13, 1960, abandoned.

[52] U.S. Cl.................179/15 BT, 307/220, 207/225, 328/15, 328/38, 307/271

[51] Int. Cl...............................................H04h 5/00

[58] Field of Search.........179/15 BT; 328/15, 20, 38, 328/158; 307/271, 220, 225, 295; 321/60, 61, 69; 235/150.3, 150.52; 329/110, 50

[56] References Cited

UNITED STATES PATENTS 3,585,411 1/1971 Cecchin et al........................307/295
3,143,663 8/1964 Johnson............................307/225 R
3,448,387 6/1969 Brandt..................................328/38

OTHER PUBLICATIONS

RCA Technical Notes No. 736 Jan. 68 Digital Multiplier by Meison

*Primary Examiner*—Kathleen H. Claffy
*Assistant Examiner*—Thomas D'Amico
*Attorney*—Mueller & Aichele

[57] ABSTRACT

Demodulation of standard FM multiplex stereophonic signals is accomplished without using a 38kHz frequency doubler operating in response to the 19kHz pilot tone signal. The first stage of demodulation is accomplished in a first gated symmetrical time gate which is supplied with the composite input signals and is switched in synchronism with the 19kHz pilot signal. The two outputs of this time gate then constitute inputs to second and third time gates which are synchronously switched by a 19kHz signal at quadrature with the signal switching the first time gate. By combining appropriate outputs of the second and third time gates, the demodulated left and right audio information is obtained.

10 Claims, 3 Drawing Figures

Inventor
FRANCIS H. HILBERT
BY
Mueller & Aichele
ATTYS.

Inventor

FRANCIS H. HILBERT

BY Mueller & Aichele

ATTYS.

FREQUENCY MULTIPLYING CIRCUIT UTILIZING TIME GATES AND SWITCHING SIGNALS OF DIFFERING PHASES

RELATED APPLICATIONS

This application is a continuation-in-part of the application of Francis H. Hilbert, Ser. No. 849,853, filed Aug. 13, 1969, now abandoned.

BACKGROUND OF THE INVENTION

In compatible stereophonic multiplex transmission, the composite stereophonic signal transmitted by a transmitting station comprises an audio frequency summation signal (L + R) of the left channel and right channel information, a difference signal (L − R) of the same information amplitude modulated on a suppressed subcarrier, and a continuous wave pilot signal which presently is of 19kHz. The L + R signals range between 0 and 15kHz and the L − R signals range between 23 and 53kHz, with the L − R signal represented by the side bands of a suppressed subcarrier of 38kHz. In addition some stations broadcast a background music channel which extends approximately 7kHz on either side of a 67kHz subcarrier signal. This background music channel generally is referred to as the "subsidiary communication authorization" (SCA) signal or "storecast signal" and is not reproduced on home receivers.

Generally, receipt of 19kHz pilot signal at the receiver is used to derive a 38kHz subcarrier which then is supplied to a demodulation circuit for deriving the desired left and right audio information present in the stereo transmission. Since normal home receivers are not authorized to receiver the SCA or "storecast" transmissions, such receivers must be provided with filters or other means for rejecting the SCA signals. Since many receivers receivers are prone to generate 57kHz and 76kHz signals in the regeneration process to cause mixing with the "storecast" or SCA components to produce audio interference, it is necessary to use special or additional filtering circuits for eliminating the "-storecast" signals, which in turn results in an increased expense in the receiver when such filters are used.

Other applications exist for frequency multiplying circuits which are readily adaptable to integrated circuit technology for producing either odd or even harmonics of a fundamental frequency with a minimum number of tuned circuits.

SUMMARY OF THE INVENTION

It is an object of this invention to provide an improved multiplying circuit.

It is another object of this invention to provide an improved stereophonic multiplex demodulator circuit.

It is an additional object of this invention to demodulate the stereophonic signals in stereophonic multiplex transmission without the use of a pilot signal doubling circuit.

It is a further object of this invention to utilize multiplication of an input by a given frequency switching signal to provide intermediate signals and then to multiply these intermediate signals in a gating circuit by a switching signal at the given frequency but at a different phase to produce a multiplied output signal.

In accordance with a preferred embodiment of this invention, an input signal is applied to the input of a first time gate having at least one output to which the input signal may be directed, with the input signal being directed to the output by a switching signal at a predetermined frequency. The output of the first time gate is used as the input to a second time gate, with the second time gate having at least one output and operating to switch signals applied to its input to the output thereof under control of a switching signal at the predetermined frequency but at a different phase from the switching signal applied to the first time gate.

In a more specific form, the input signal is a composite stereophonic signal, and the first and second time gates each have first and second outputs, with the inputs being alternately connected to the first and second outputs thereof. A third time gate, having an input and first and second outputs, also is provided. The first output of the first time gate is connected to the input of the second time gate and the second output of the first time gate is connected to the input of the third time gate. The desired demodulated left and right audio signals are obtained by supplying the switching signals to the second and third time gates at phase quadrature with the switching signal applied to the first time gate. One of the outputs of each of the second and third time gates is combined to form one of the audio outputs and the other of the outputs of each of the second and third time gates is combined to provide the second of the audio outputs for the demodulated stereophonic signal.

DETAILED DESCRIPTION

Figures 1, 3:
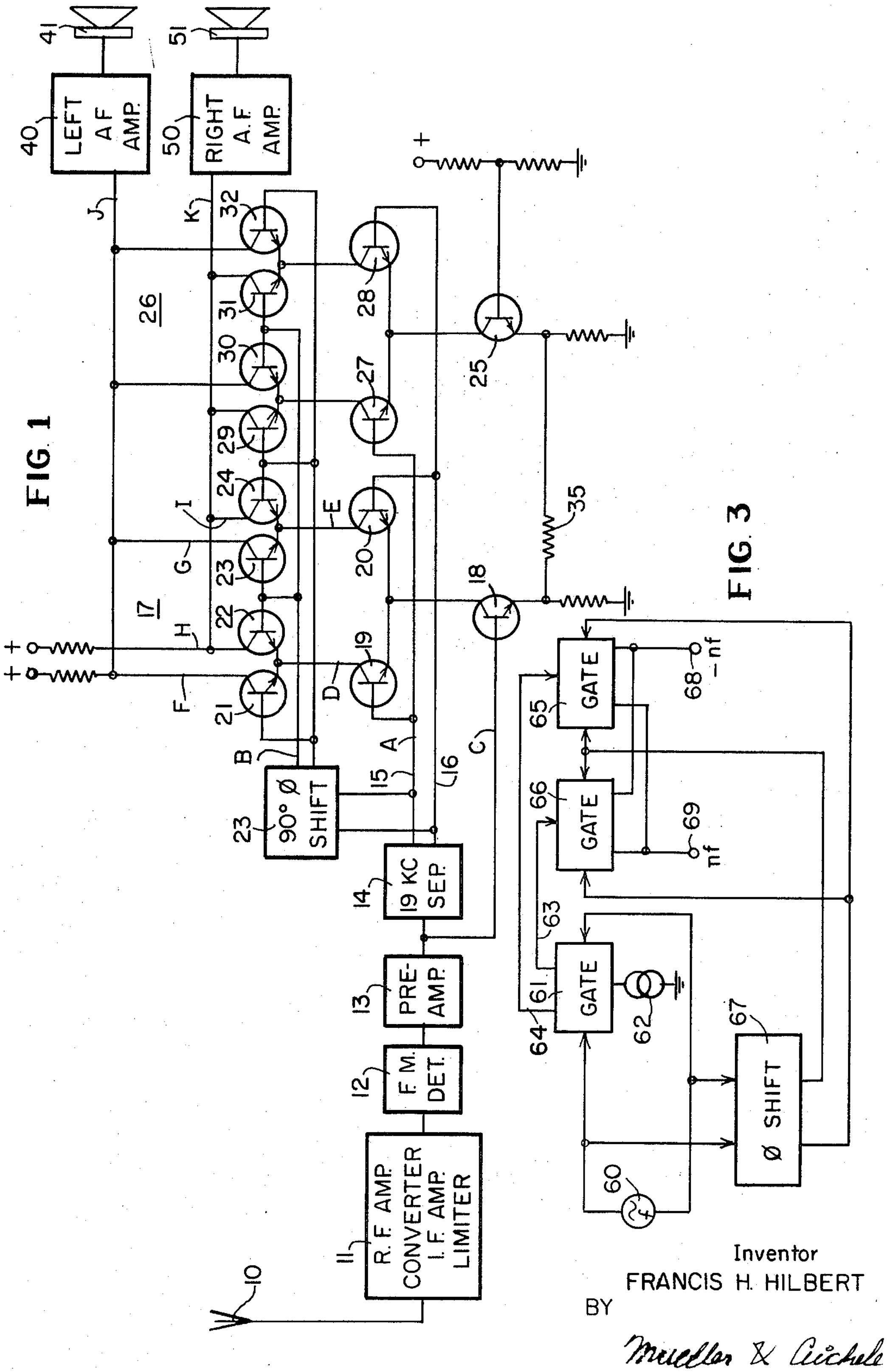
FIG. 1 of the drawing is a schematic diagram, partially in block form of a preferred embodiment of the invention.
FIG. 3 illustrates another embodiment of the invention.

Referring now to the drawing, there is shown a stereophonic multiplex receiver including a demodulator circuit which may be in the form of an integrated circuit. A frequency modulated (FM) carrier wave containing the sum signal of the left and right audio signals (L + R), the difference signal of the left and right audio signals (L − R) amplitude modulated on a suppressed carrier wave, and a pilot signal having a frequency one-half that of the suppressed subcarrier frequency is received by an antenna 10 and is applied to a receiver circuit 11. The circuit 11 represents the usual RF amplifier, converter, IF amplifier, and limiter, which may be of known design. The output of the receiver circuit 11 then is supplied to an FM detector 12 and preamplifier circuit 13 where the composite signal is detected and amplified.

Whenever stereophonic signals are being received and detected by the detector 12, the 19kHz pilot signal component is detected and separated by a 19kHz signal separating circuit 14 which generally includes a tank circuit tuned to the 19kHz signal frequency. The output of the 19kHz signal separater circuit 14 is provided over a pair of leads 15 and 16, with the signals appearing on these leads being 180° out of phase with one another at the 19kHz signal frequency. Thus, whenever the signals present on the lead 15 are positive, the signals appearing on the lead 16 are negative, and vice-versa.

Figure 2:
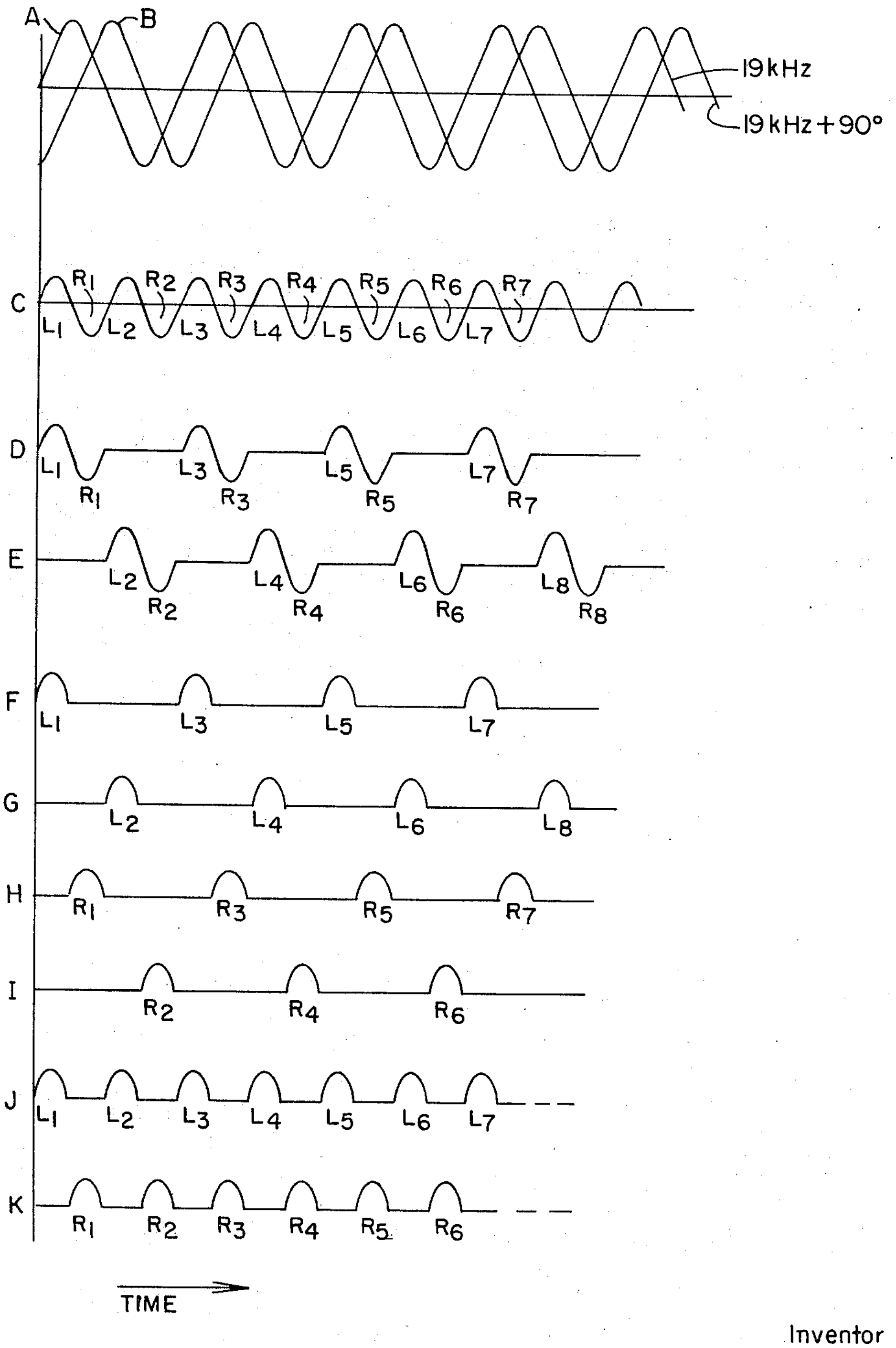
FIG. 2 illustrates waveforms useful in understanding the operation of the circuit shown in FIG. 1.

This 19kHz signal appearing on either of the leads 15 and 16 is illustrated in FIG. 2 as waveform A. In the ensuing description of the operation of the circuit shown in FIG. 1, the waveform appearing at different parts of the circuit of FIG. 1 are shown in FIG. 2, with the letter reference used in FIG. 2 to identify the waveform also being used on the lead or terminal shown in FIG. 1 where that waveform appears. Thus, the signal appearing on the lead 16 in FIG. 1 is identified by the letter A in FIGS. 1 and 2.

In place of utilizing the conventional frequency doubler to reconstruct the suppressed carrier 38kHz signal, the output signals appearing on the leads 15 and 16 from the 19kHz signal separator circuit 14 are applied through a phase shifting circuit 23 which provides for a 90° phase shift in the output signals of the signal separator circuit 14. This quadrature signal appears on the pair of output leads from the circuit 23 and is indicated by waveform B in FIG. 2.

The composite signals, including the amplitude modulated suppressed subcarrier wave are applied from the output of the pre-amplifier circuit 13 to the base of a first NPN demodulator input transistor 18, with these signals being represented by the 38kHz signal waveform C in FIG. 2. The emitter of the transistor 18 is connected through an emitter resistor to ground, with the collector being connected in common to the emitters of a pair of NPN transistors 19 and 20, forming the gating or switching transistors of a first synchronous time gate in the demodulator circuit 17. As a result, the stereophonic input signals appearing on the collector of the input transistor 18 are applied to both of the switching transistors 19 and 20. The switching transistors 19 and 20 are supplied with switching signals on the bases thereof over the leads 15 and 16, respectively, so that the switching transistors 19 and 20 are rendered conductive on alternate half cycles of the 19kHz signal.

For the purposes of illustration, assume that the transistor 19 is rendered conductive during the positive half cycles of the waveform A shown in FIG. 2 and that the transistor 20 is rendered conductive during the negative half cycles of the waveform A. Thus, during the time that the transistor 19 is conductive, the signal applied to the junction of the emitters of the transistors 19 and 20 appears on the collector of the transistor 19; and this signal is shown in FIG. 2 as waveform D. It will be noted from an examination of the waveforms C and D in FIG. 2 that the signals of waveform D, appearing on the collector of the transistor 19, include all of the odd left and right audio information. In a similar manner, during the other half cycles of the 19kHz switching signal applied to the base of the transistor 20, the transistor 20 conducts; and the signals appearing on the collector thereof are shown in waveform E and constitute all of the even left and right audio information.

The signals on the collectors of the transistors 19 and 20 then are applied, respectively, to second and third synchronous time gate circuits including the transistors 21 and 22 for the second synchronous time gate and the transistors 23 and 24 for the third synchronous time gate. The emitters of the transistors 21 and 22 are connected in common to the collector of the transistor 19 to receive the signals D, and the emitters of the transistors 23 and 24 are connected in common to the collector of the transistor 20 to receive the signals E.

The two time gates including the transistors 21 thru 24 are operated in a manner similar to the operation of the time gate including the transistors 19 and 20, but are supplied with 19kHz switching signals in phase quadrature with the 19kHz switching signals applied to the bases of the transistors 19 and 20. The transistors 21 and 24 are rendered conductive simultaneously for one-half cycle of this phase quadrature 19kHz switching signal, and the transistors 22 and 23 are rendered conductive for the other half cycle of the phase quadrature 19kHz signal. With the waveforms A and B having the relationship shown in FIG. 2, the transistors 22 and 23 are rendered conductive during the positive half cycles of the waveform B illustrated in FIG. 2; and the transistors 21 and 24 are rendered conductive during the negative half cycles of the waveform B. Because of the phase quadrature relationship of the switching signals applied to the second and third time gates, the signals appearing on the collector of the transistor 21 now include only the odd left channel audio information indicated by waveform F. Similarly, the signals appearing on the collector or the transistor 23 contain the even left information indicated by the waveform G, with the odd right information appearing on the collector of the transistor 22 and the even right information appearing on the collector of the transistor 24, these signals being indicated by the waveforms H and I, respectively.

The full left audio information then is recovered by interconnecting the collectors of the transistors 21 and 23 to provide all of the odd and even left information, indicated by waveform J, to the left audio frequency amplifier 40, the output of which is supplied to a loudspeaker 41. Similarly, the signals appearing on the collectors of the transistors 22 and 24 are interconnected to supply all of the odd and even right audio information, indicated by waveform K, to the right audio frequency amplifier 50, the output of which also is supplied to a loudspeaker 51.

The synchronous gating in the three synchronous gates including the transistors 19, 20; 21, 22; and 23, 24 thereby provided complete demodulation of the left and right stereophonic information without the necessity of a 38kHz doubling circuit of the type commonly employed. By using synchronous gating, employing the quadrature 19kHz signals as the gating signals in symmetrical gates, no even harmonics are produced; so that there is no necessity for additional storecast filter provisions of the type commonly employed. Sampling at the 38kHz rate still is accomplished because of the double sampling at the 19kHz frequency.

The signal produced in the circuit thus far described inherently has a known amount of crosstalk in addition to the desired stereophonic output with standard FM broadcast signal. In order to eliminate or substantially reduce this crosstalk, a second demodulator 26, identical to the demodulator 17, is provided. A second NPN input transistor 25 supplies opposing phase input signals to a first synchronous time gate including a pair of NPN transistors 27 and 28, which are alternately switched by the 19kHz signal present on the leads 15 and 16.

The outputs of the transistors 27 and 28 are reduced in amplitude and opposite in phase to the outputs of the transistors 19 and 20 and supply the input signals for second and third synchronous time gates consisting of pairs of transistors 29, 30, and 31, 32, respectively. The transistors 29, 30, 31, and 32 correspond in operation to the operation of the transistors 21, 22, 23 and 24, respectively, and produce demodulated output signals of reduced amplitude and opposite phase sufficient to cancel crosstalk.

To cause these reduced amplitude output signals from the demodulator 26, the input signals for the demodulator 26 are substantially attenuated from the input signals for the demodulator 17. These input signals are obtained from the emitter of the transistor 18 and are applied through an attenuating resistor 35 to the emitter of the transistor 25. The value of the resistor 35, operating in conjunction with the emitter resistors for the transistors 18 and 25, is chosen to provide an exact amount of attenuation for causing the primary signals appearing on the collectors of the transistors 29, 30, 31 and 32, to be equal in magnitude to the magnitude of the crosstalk signal components appearing at the output of the switching transistors 21, 22, 23 and 24 in the demodulator 17. Although the resistor 35 has been shown connected in a $\pi$ network, a T network will function equally as well, with the resistor 35 being in the form of a pair of resistors, the junction of which is connected through a common resistor to ground.

Although the demodulator switching transistors 29, 30, 31 and 32, are operated simultaneously with the operation of the transistors 21, 22, 23, and 24, as described previously, it should be noted that the output connections from the transistors of the demodulator 26 are reversed from the output connections of the demodulator 17. As a result whenever the transistor 21, for example, conducts to supply the desired L signal to the amplifier 40, along with a relatively small component of crosstalk from the R signal, the transistor 29 applies an attenuated L signal plus an even smaller R crosstalk component to the amplifier 50. This attenuated L signal is in phase opposition with the L crosstalk signal component supplied to the R or right amplifier 50 by the transistor 22, so that the signal from the transistor 29 is subtracted from the signal supplied to the amplifier 50 by the transistor 22. The magnitude of the attenuated L component obtained from the transistor 29 is chosen to be equal to the magnitude of the L crosstalk component obtained from the output of the transistor 22 at the input to the amplifier 50.

A comparable pairing of the transistors 30, 31, and 32 of the demodulator 26 can be made with the remaining transistors of the demodulator 17. Thus, the out-of-phase attenuated signals obtained from the demodulator 26 cancel the crosstalk components present at the outputs of the transistors in the demodulator 17. The attenuated crosstalk components present at the outputs of the demodulator 26 also are subtracted from the desired outputs of the demodulator 17; but this reduction in the desired outputs is so small, due to the high degree of attenuation which takes place in the signals applied through the resistor 35 to the emitter of the transistor 25, that it has no noticeable affect on the output obtained from the demodulator 17 and reproduced in the speakers 41 and 51.

In addition to providing crosstalk cancellation, the demodulator 26 fills in the "holes" in the outputs of the demodulator 17 to maintain a constant DC operating point at the inputs to the amplifiers 40 and 50. This constant operating point permits the circuit to be operated without conventional filtering usually required for eliminating the 38kHz components, and harmonics thereof, from the output signals applied to the inputs of the amplifiers 40 and 50. In addition, this symmetrical, balanced operation of the demodulator circuit also aids in eliminating the need for separate "-storecast" filters in the circuit.

The demodulator circuit shown in FIG. 1 is especially suitable for use in integrated circuit applications in which the number of transistors used is not excessive. By eliminating the extra tuned circuit normally associated with the 38kHz doubler and by eliminating the storecast filter circuit the circuit provides a means by which the major portion of a stereophonic receiver can be formed on a single integrated circuit chip with a minimum requirement for outside components.

Although the foregoing description has been directed to a circuit which provides simultaneous demodulation and doubling of the 19kHz pilot signal, the frequency multiplying technique which is employed also may be used to produce directly a 38kHz subcarrier reference signal, which then may be applied to a separate demodulator circuit of conventional type. Such a circuit is illustrated in block diagram form in FIG. 3 which shows an AC source 60 producing a basic reference frequency which is to be multiplied by the remainder of the circuit shown in FIG. 3.

The signal obtained from the output of the source 60 then may constitute a switching signal of the type used to drive the transistors 19 and 20 of the first time gate illustrated in FIG. 1. A similar time gate 61 is shown in FIG. 3, but the details of this gate are not illustrated since it is of substantially the same type as the gates 19/20,21/22, or 23/24 illustrated in FIG. 1. Thus, the time gate 61 constitutes a differential switching circuit having a common input connected through an input signal source 62 to ground.

If the circuit shown in FIG. 3 is to be used as a multiplier circuit for multiplying the basic frequency obtained from the output of the source 60, the input signal source 62 may constitute a constant current DC source. Or in its simplest form the source 62 may constitute a resistor connected between the input of the gate 61 and ground, it being understood that the remainder of the gating circuit 61 is comparable to the gating circuits shown in detail in FIG. 1.

Assume for the purposes of this illustration, however, that the circuit 62 is a constant current DC source. With such a DC current source coupled to the input of the gate 61 to provide the input signal for the gate 61, the first and second output leads 64 and 63 each are connected by the gate 61 to the current source 62 on alternate half-cycles of the signal obtained from the input switching signal source 60. These signals obtained on the leads 64 and 63 constitute input signals supplied, respectively, to second and third time gates 65 and 66, which are of the same type as the time gate 61.

Switching signals for the time gates 65 and 66 then are obtained from the output of the signal source 60 after being passed through a phase shifting circuit 67, which applies switching signals at the same frequency as the switching signals applied to the time gate 61 but at a different phase. If the phase shift circuit 67 provides a 90° or quadrature phase shift and the outputs of the gates 65 and 66 are cross-coupled in manner similar to the cross-coupling of the gates 21/22 and 23/24 shown in FIG. 1, a 38kHz reference signal is produced at opposite phases on output terminals 68 and 69. This reference signal then may be utilized in a stereophonic demodulator as the reconstructed 38kc subcarrier signal for effecting demodulation of a stereophonic signal.

The circuit shown in FIG. 3, however, has general utility beyond that of frequency doubling. By providing different degrees of phase shift in the phase shift circuit 67, other harmonics of the basic frequency obtained from the source 60 may be obtained from the outputs of the gates 65 and 66. If symmetrical gating of the gates 65 and 66 with respect to the gating of the gate 61 is provided, the outputs of the gates 65 and 66 will be at odd harmonics of the signal frequency of the source 60. For non-symmetrical gating, such as the type described above wherein a quadrature phase shift is provided by the circuit 67, even harmonics are produced at the outputs of the gates 65 and 66.

The particular harmonics selected can be further varied by cascading other stages of time gates to the outputs of the gates 65 and 66 in the same manner as the outputs 64 and 63 from the gate 61 are provided as input signals to the gates 65 and 66, respectively. Of course when this is done, cross-coupling of the outputs of the gates 65 and 66 would not be utilized; but each of the outputs of these gates would be applied as an input signal to a different corresponding time gate cascaded thereto.

In addition it should be noted that it is not necessary to use both of the outputs which are available from each of the gates. Only a single output of one or more of the gates could be used for circuit applications requiring only such a single output to be cascaded to other gates or to be used as the output from the system. The number of stages to be cascaded is limited only by the choice of the desired harmonic of the gating signal which is to be obtained from the system. The number of gates may be cascaded indefinitely to produce any desired harmonic of the gating signal through appropriate choice of the gating angles.

It also should be noted that if the signal source 62 is an AC signal source, the circuit shown in FIG. 3 may be used as a modulator circuit, with the signal frequency of the source 60 controlling the modulating frequency of the AC signal source 62.

I claim:

1. A multiplying circuit including in combination: A first time gate having an input and first and second outputs and responsive to an alternating switching signal for coupling the input alternately with the first and second outputs on alternate half-cycles of the switching signal;

means for supplying an input signal to the input of said first time gate;

means for supplying a first alternating switching signal at a predetermined frequency to said first time gate;

second and third time gates, each having an input connected to a different output of said first time gate and each having first and second outputs, said second and third time gates each being responsive to an alternating switching signal applied thereto for coupling the inputs thereof alternately with the first and second outputs thereof on alternate half-cycles of the switching signal;

means for supplying a second switching signal at the predetermined frequency of the first switching signal, but at a different phase, to said second and third time gates;

means for combining the first output of the second time gate with the second output of the third time gate; and means for combining the second output of the second time gate with the first output of the third time gate.

2. The combination according to claim 1 wherein said means for applying the second switching signal to said second and third time gates includes phase-shift circuit means responsive to the output of said means for applying the first switching signal to said first time gate.

3. A signal multiplying circuit including in combination:

a first time gate having an input and first and second outputs;

means for supplying an input signal to the input of the first time gate;

means for supplying a first switching signal at a predetermined frequency to the first time gate for switching the input signal applied to the input thereof from the first output to the second output on alternate half-cycles of the switching signal;

second and third time gates, the inputs of which constitute, respectively, the first and second outputs of the first time gate, each of the second and third time gates having first and second outputs;

means for applying a second switching signal at said predetermined frequency and in phase quadrature with the first switching signal to the second and third time gates for causing the second and third time gates to alternately switch the signals applied to the inputs thereof to the first and second outputs thereof on alternate half-cycles of the switching signal applied thereto; and means for combining predetermined outputs of the second and third time gates to develop an output signal.

4. The combination according to claim 3 wherein the second switching signal applied to the second and third time gates is obtained from the output of a phase shifting means having as its input the switching signal applied to the first time gate, with the phase shifting means providing a 90° phase shift to signals applied to the input thereof.

5. The combination according to claim 3 wherein said signal multiplying circuit is for use in a receiver for receiving a composite stereophonic multiplex radio signal comprising a carrier FM modulated by an audio frequency summation signal, a difference signal of the same information amplitude modulated on a suppressed subcarrier, and a continuous wave pilot signal subharmonically related to said subcarrier signal; the means for supplying an input signal to the input of the first time gate supplies at least the subcarrier component of said composite signal to such input; the means for supplying the first switching signal is responsive to the pilot signal portion of the composite signal, with said predetermined frequency being the frequency of the pilot signal portion; and the means for combining predetermined outputs of the second and third time gates includes first combining means for combining one of the outputs of each of the second and third time gates to develop one of said audio signals substantially separated from the other of said audio signals, and second combining means for combining the other of the outputs of each of the second and third time gates to develop the other of said audio signals substantially separated from the one of said audio signals.

6. The combination according to claim 5 wherein the second switching signal is obtained from the output of a phase shifting means having as its input the first switching signal, with the phase shifting means providing a 90° phase-shift to signals applied to the input thereof.

7. The combination according to claim 5 wherein the first combining means combines the first output of the second time gate and the second output of the third time gate, the second combining means combines the second output of the second time gate and the first output of the third time gate, and the means for applying the second switching signal to the second and third time gates to alternately enable the first outputs and the second outputs thereof to pass signals applied to the inputs thereof.

8. The combination according to claim 7 wherein the input signal supplying means supplies at least the summation signal and the modulated suppressed carrier to the first gating means and includes an input transistor; and wherein the first, second and third time gates each include first and second switching transistors, all of said transistors having a base, emitter, and collector, the input signals being supplied to the base of the input transistor, the collector of which is coupled with the emitters of the transistors of the first time gate; the first and second switching signals are supplied to the bases of the transistors of the respective first, second and third time gates, with the first and second transistors thereof conducting on alternate half-cycles of the supplied switching signals; the collectors of the first and second transistors of the time gates comprise the first and second outputs thereof, respectively, and the emitters of the transistors in each time gate are interconnected to form the input thereof.

9. The combination according to claim 7 wherein the means for applying the second switching signal includes means for shifting the phase of the first switching signal, with the output of the phase shifting means constituting the second switching signal.

10. The combination according to claim 9 wherein the phase shifting means shifts the phase of the first switching signal 90° to provide the second switching signal.

* * * * *